United States Patent Office 3,190,240
Patented June 22, 1965

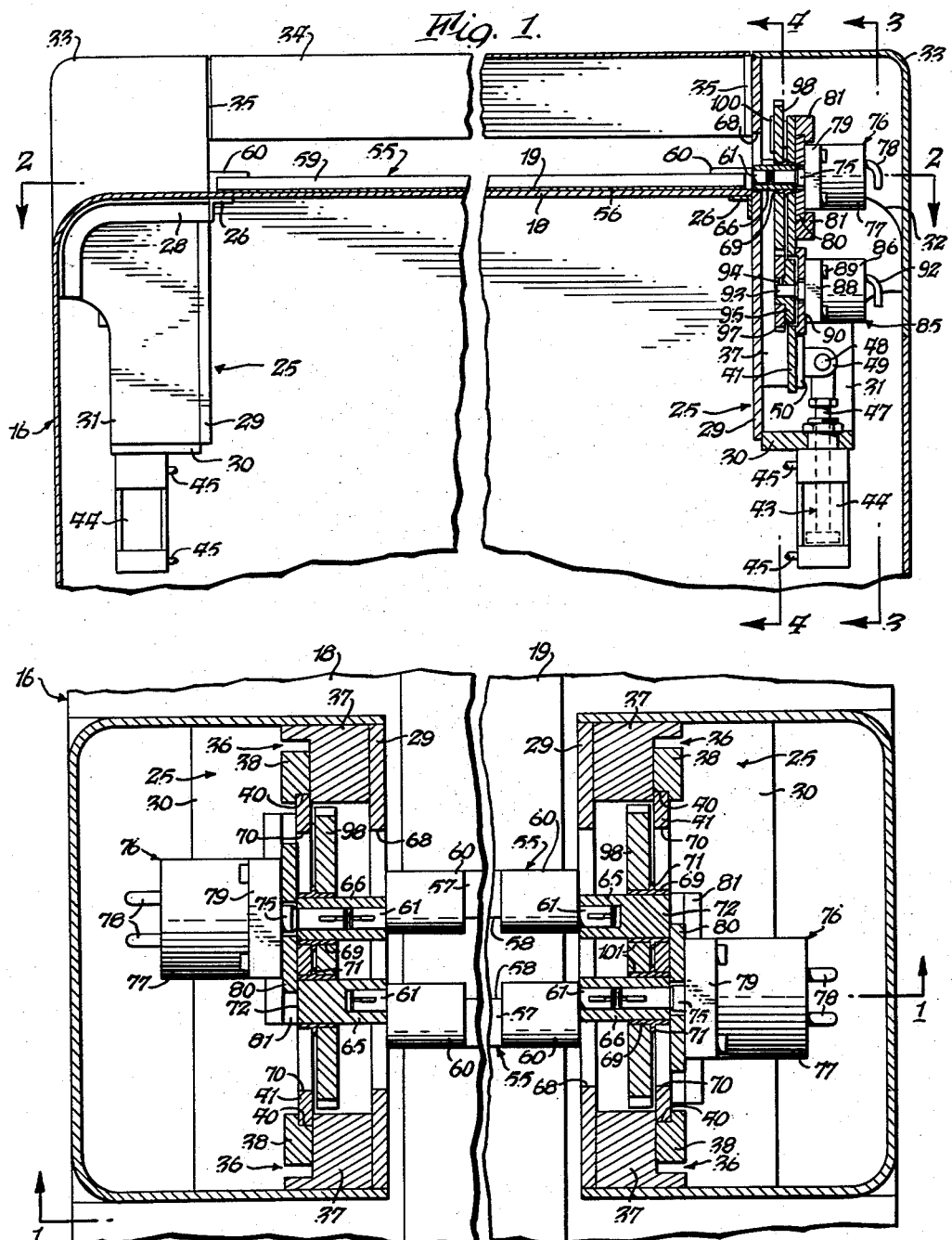

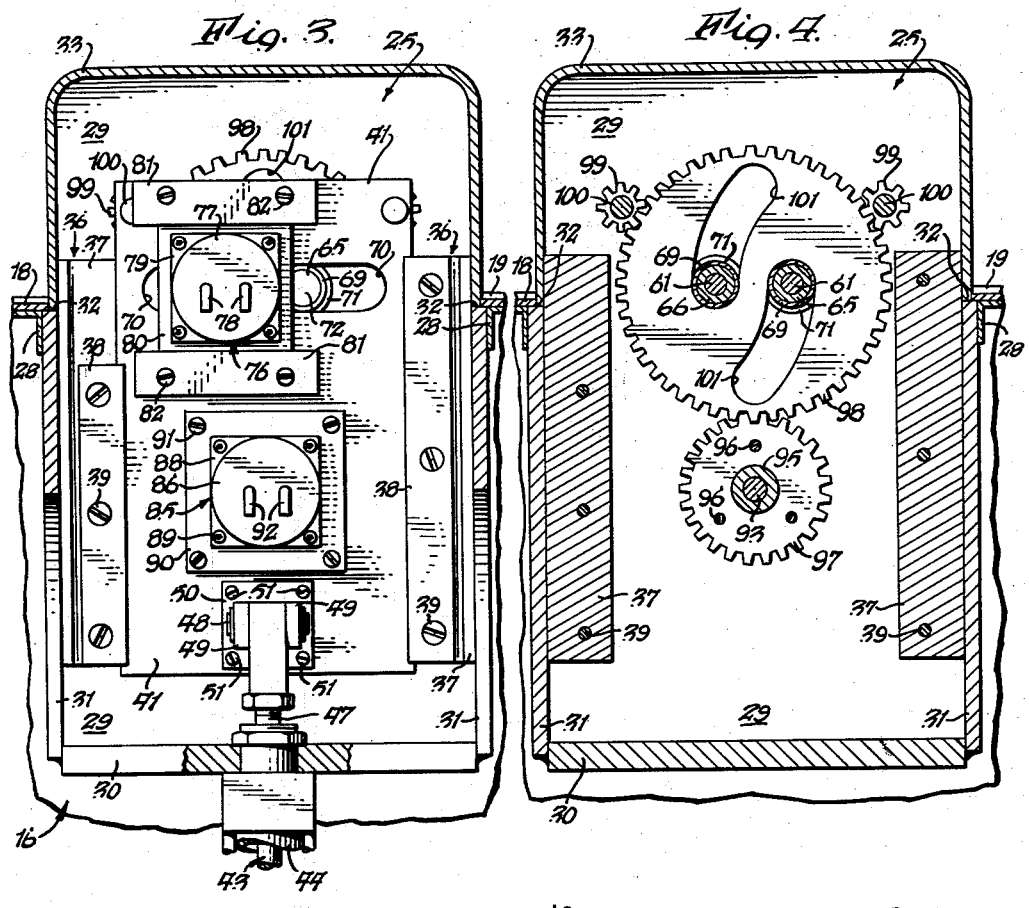
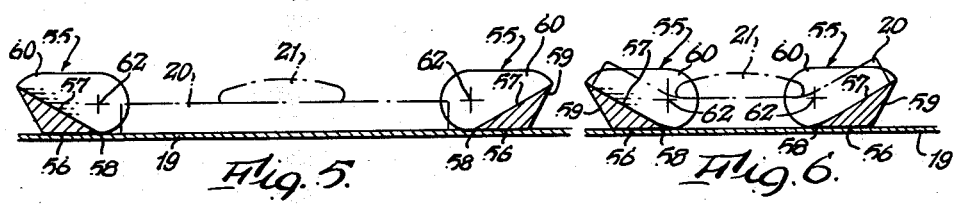
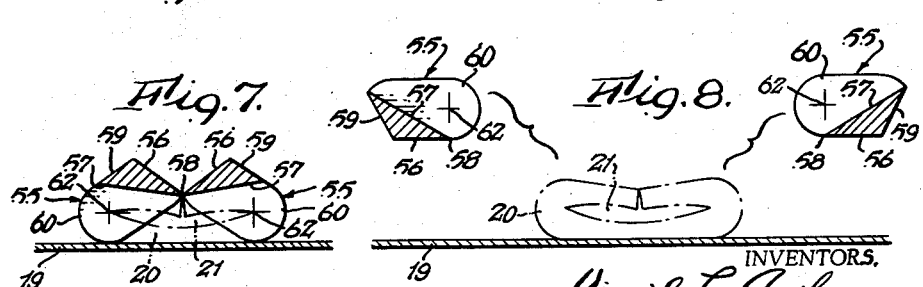

3,190,240
FOLDING DEVICE FOR COOKIE MAKING MACHINE
Virgil L. Archer, 205 N. 3rd St., Olean, N.Y., and Franc A. Spilsbury, 140 Bancroft Drive, Ebenezer, N.Y.
Filed Aug. 16, 1962, Ser. No. 217,471
12 Claims. (Cl. 107—1)

This invention relates to a device for simultaneously folding or turning over the edges of a row of unbaked cookies in the form of drops or lumps of dough previously placed and shaped upon the cookie stations of a moving conveyor, such a belt, the folding being either a single fold from one side of the row or a double fold from opposite sides of the row.

The present application is particularly related to the following copending applications; Archer, Flour Dropper for Cookie Making Machine, Serial No. 188,418 filed April 18, 1962; Archer, Dough Dropper for Cookie Making Machine, Serial No. 188,384, filed April 18, 1962; Archer and Challender, Flattening and Flour Dusting Device for Cookie Making Machine, Serial No. 221,768, filed Sept. 6, 1962, and Archer, Challender and Roll-Jelly Dropper for Cookie Making Machines, Serial No. 223,503, filed Sept. 13, 1962.

An important object of the present invention is to provide a cookie folder which will handle all forms of cookie dough including very fluid and limp doughs as well as stiff plastic doughs and also including doughs containing edible solids such as nuts, raisins, and the like.

Another important object of the invention is to provide such a cookie folder in which there is minimum mechanical working of the dough in folding the unbaked cookies, such mechanical working tending to impair the texture of the cookie by resulting in a heavier and denser cookie.

Another object of the invention is to handle the unbaked cookie with a minimum of pressure thereon, high pressure against the dough again tending to impair the texture and quality of the cookie by resulting in a denser and heavier cookie.

Another most important object of the present invention is to provide such a device which will fold over portions of a long row of unbaked cookies upon a moving conveyor or the like in which the folded cookies are all identical as to shape so as to result in cookies of identical appearance when baked.

Another object is to provide such a cookie folder which is rapid in its action so that it can be used in conjunction with high speed line production of cookies.

Another object is to provide such a folding device which can be readily adjusted to produce different types of folds upon different sizes of cookies, that is, it can be adjusted to act upon large or small cookies and can be adjusted to produce a single fold, folding the row of cookies along their common center line, or produce a double fold by folding the row of cookies along two lines. The folds may enclose a body or pat of jelly, jam, or other topping or filling material previously placed upon each cookie.

Another important object of the present invention is to provide such a cookie folder which is easily kept in a clean and sanitary condition and in particular can be washed down and sanitized at the end of each run.

Another most important object of the invention is to provide such a cookie folder which is simple and inexpensive in construction and which is free from servicing difficulties and does not require close attention on the part of the operator.

Other objects and advantages of the invention will appear from the following description and drawings in which:

FIG. 1 is a fragmentary side elevational view, partly in section, of a cookie folder embodying the invention, this view being taken on line 1—1, FIG. 2, and being shown as mounted on a table carrying a conveyer belt which is bridged by the folding device, the belt and table being shown in section.

FIG. 2 is a fragmentary enlarged horizontal section taken generally on line 2—2, FIG. 1.

FIGS. 3 and 4 are fragmentary vertical sections taken generally on the correspondingly numbered lines of FIG. 1.

FIGS. 5–8 are diagrammatic views illustrating the manner in which the blades act successively to cut under, lift, turn over, press down and retract from the unbaked cookies of each row being advanced on the conveyer of the cookie making machine.

The cookie folder forming the subject of the present invention is designed for use in conjunction with a cookie making machine having a base 16 providing a horizontal table top 18 carrying a belt 19 which is bridged by the cookie folder which is shown as adjusted to fold over the front and rear sides of unbaked cookies 20 in the form of dough previously placed and shaped on the belt and which unbaked cookies can also each have a body or pat of jelly or jam 21 all as described in detail in the said copending applications. Successive rows of the unbaked cookies 20 are arranged transversely of the belt which is advanced with a step-by-step movement in synchronism with the operation of the cookie folder so that the folding operation of the latter takes place while the slide is momentarily stationary. The cookies are on cookie stations which are uniformly spaced along each row.

The cookie folding device of the present invention is shown as supported by a pair of end heads 25 mounted at opposite sides of the table top 18 and projecting downwardly into the base 16. The table top 18 is reinforced along these end heads by angle irons 26 extending longitudinally of the belt 19 and secured to the under side of the table top. Additionally the base 16 can be reinforced by curved angle irons 28 and other suitable reinforcements.

Each end head 25 is preferably in the form of a rectangular plate 29 along the bottom edge of which is secured, as by welding, a horizontal bottom plate 30 and to the opposite side edges of which are secured, as by welding, vertical side plates 31. The upper edges 32 of the side plates preferably conform to the upper edges of the curved reinforcing angles 28, and each end head 25 is preferably completed by a cover or shell 33 having an upper horizontal edge fitting the upper edge of its vertical plate 29, upper vertical edges fitting the side edges thereof, a curved bottom edge fitting the edge 32 of the side plates 31, and a bottom edge fitting the top edge of the side wall of the base 16, all as best illustrated in FIGS. 1 and 3.

The frame of the cookie folder is completed by an inverted channel shaped shell 34 the opposite edges of which abut the opposing faces of the vertical plates 29 of the end heads 25 and having end heads 35 which can be removably supported on these vertical plates 29.

Secured along each vertical edge of the vertical plate 29 of each end head 25 is a track 36 comprising a vertical rail 37 secured to the vertical plate 29 and a retaining rail 38 removably secured to the fixed rail 37 as by screws 39, and these rails forming opposing slots or ways 40 in which the opposite edges of a vertical slide plate 41 are slidingly contained. The slide plates are reciprocated vertically in unison by a piston 43 contained within a vertical cylinder 44 fixed to the under side of the bottom plate 30 of each end head and actuated through fluid supplied by lines 45. The piston rod 47 of each piston 43 projects above the bottom plate 30 and is connected by a pivot pin 48 to the ears 49 of a bracket 50 which is shown as secured by screws 51 to the lower part of the slide plate 41.

The cookie turner is shown as lifting and folding over both the front and rear portions of a row of unbaked cookies 20 while the step-by-step conveyer belt 19 is momentarily at rest. This is done by a pair of blades 55 which are of triangular form in cross section as illustrated in FIGS. 5–8, having a bottom face 56 engageable with the belt 19, an inclined face 57 forming with the bottom face 56, a cutting edge 58 cutting along the bottoms of the row of unbaked cookies 30, and a third or heel face 59. The opposite ends of each of these blades 55 are formed to provide enlarged laterally offset end heads 60. These end heads 60 of each blade protrude horizontally toward the opposite blade, in the position of these blades illustrated in FIG. 5, and these end heads of each blade have coaxial hubs 61 projecting outwardly thereon. The axis 62 of each pair of hubs 60 is in vertically spaced relation to the cutting edge 58 of its blade, in the position of the blade as illustrated in FIG. 5.

The hub 61 at one end of each blade 55 is keyed within a trunnion 65, while the hub 61 at the opposite end of each blade 55 is keyed within a trunnion 66. The trunnions 65, 66 project through openings 68 of the fixed vertical plates 29 of the end heads 25 which openings permit movement of the trunnions of the blades up and down, toward and from each other and also permit rotation about the axes 62 of these trunnions. Each trunnion 65, 66 is journalled in a bearing bushing 69 contained within a horizontal slot 70 in the corresponding vertically movable slide plate 41, these slots 70 rotatably supporting these bearing bushings and also permitting their movement in a horizontal plane. Each bearing bushing 69 is provided with a radially outwardly projecting flange 71 fitted against the face of the slide plate 41 which opposes the belt 19 and which serves as a spacer.

Each trunnion 65 has its outer end closed or blind, as indicated at 72, whereas each trunnion 66 is in the form of a tubular open ended sleeve. Also the blind trunnion 65 for the one blade 55 is arranged on one side of the belt 19 whereas the blind trunnion 65 for the other blade 55 is arranged on the opposite side of this belt.

The output shaft 75 of a reversible part turn rotary actuator 76 is keyed within each of the trunnion sleeves 66, each of these reversible part turn rotary actuators having a housing 77 supplied with fluid from lines 78 under suitable control (not shown) to rotate the output shafts 75 any desired number of degrees in any desired range. The housing 77 of each reversible part turn rotary actuator is provided with a square base portion 79 attached to a rectangular, horizontally moving slide plate 80, this plate in turn being carried by horizontal upper and lower rails 81 secured to the vertically moving slide plate 41 as by screws 82. Through this mounting on the horizontal rails 81, each pair of horizontally moving slide plates 80, together with the blades 55 carried thereby can be moved toward and from each other, this movement being preferably effected as follows:

The numeral 85 represents a reversible part turn rotary actuator associated with each end head 25 and having a casing or body 86 and a square base portion 88 secured, as by screws 89, to a square plate 90 which in turn is secured, as by screws 91, to the vertically reciprocating slide plate 41. Each reversible part turn rotary actuator 80 has hydraulic lines 92 which control the rotary movement of its output shaft 93 to any number of degrees and in any range. To this output shaft 93 is secured, as by a set screw 94, the hub of a disk 95 and to this disk is secured as by screws 96, a pinion 97. Each pinion 97 meshes with the teeth of an overhead gear 98, the teeth of this gear also being engaged by idler pinions 99. The stub shafts 100 supporting these idler gears project from the vertically moving slide plate 41 and the pinions 97 and 99 are preferably spaced approximately equidistant from one another around the teeth of the gear 98 so as to maintain each gear in a fixed axis with reference to the vertically movable slide plate 41.

The gear 98 associated with each end head 25 has a pair of arcuate cam slots 101 therein the concave sides of which are in opposing relation to each other. In the pair of cam slots 101 of each gear 98 is fitted the outer ends of the corresponding bearing bushings 69, this gear 98 being fitted against the outwardly projecting flanges 71 of these bushings. As previously indicated, the pair of bearing bushings 69 associated with each end head 25 journal the trunnions 65 and 66 supporting the adjacent ends of the two blades 55.

In the operation of the cookie making machine the belt 19 on the table 18 is advanced step by step so as progressively to bring a transverse row of cookie stations thereon under the cookie turner forming the subject of the present invention. Before the cookie turner is reached a drop or lump of dough has been placed on each of these cookie stations and this drop or lump has been formed into the unbaked cookie 20 and, if a filled cookie is desired, a pad or body of jelly, jam or other filling or topping 21 has been placed upon each of these unbaked cookies. These preparatory operations, including flouring and dusting the unbaked cookie 20 form the subject of the copending applications previously listed.

The movement of the step-by-step belt is successively halted in centered relation to the zone of action of the blades 55, which at this time are in the elevated inoperative position illustrated in FIG. 8, so as not to interfere with the advance of the row of unbaked cookies 20 into centered position in this zone of action. When the step-by-step belt comes to a stop, fluid is introduced to the pair of cylinders 44 at opposite sides of the belt 19 via lines 45 so as to retract the pistons 43 and piston rods 44 downwardly. Through the brackets 50, this lowers each of the vertically movable slide plates 41 until the faces 56 of the two blades 55 carried by these vertically moving slide plates 41 are brought in contact with the belt 19 ahead and behind, respectively, of the row of unbaked cookies 20. This position of these blades is illustrated in FIG. 5.

Hydraulic fluid is now introduced, via the control lines 92, into the pair of reversible part turn rotary actuators 85 at opposite sides of the belt 19. This rotates each pinion 96 through the drive comprising the output shaft 93 of the actuator, the disk 95 connected to this output shaft and the pinion 96 fixed to this disk. At this time the rotation of the output shafts 93 is such as to rotate each pinion 96 counterclockwise as viewed in FIG. 4. This rotates the gears 98 associated with the two end heads 25 clockwise, as viewed in FIG. 4, this gear being held in engagement with the pinion 96 by the idler pinions 99. This clockwise movement of the gears 98 causes the bearing bushings 69 contained within the pair of arcuate cam slots 101 to travel from the outboard ends of these slots toward the inboard ends thereof the latter position being illustrated in FIG. 4. This movement of these bearing bushings along these slots causes the blades 55 to move toward each other in a horizontal plane and the cutting edges 58 of these blades to cut under the front and rear sides of the row of cookies. This also causes the front and rear portions of the row of cookies to ride up on the inclined faces 57 of these blades. This horizontal movement of the blades 55 toward each other terminates in the position illustrated in FIG. 6.

The blades are so compelled to move in a horizontal plane, in response to the movement of the bearing bushings 69 from the outboard to the inboard ends of the cam slots 101 in the gear 98, by virtue of the containment of these bearing bushings 69 in the horizontal slots 70 of the vertically movable slide plate 41. Thus because of these horizontal slots 70 in the slide plate, these bearing bushings can only move in a horizontal plane with reference to the vertically moving slide plate so that the action of the cam slots 101 can only operate to move these bushings toward and from each other in a horizontal plane. Since these bushings journal the trunnions 65, 66 at opposite ends of the blades 55 this horizontal movement of these bushings 69 toward and from each other is translated into a movement of the blades 55 toward and from each other in a horizontal plane, as above described.

When the blades 55 reach the position shown in FIG. 6, the pair of reversible part turn rotary actuators 76 are energized through the introduction of fluid through their lines 78. The rotative movement of the output shaft 75 of each of these reversible part turn rotary actuators is transmitted through the corresponding tubular trunnions 66 to the adjacent hub 61 of the corresponding blade 55 so as to turn each blade 55 about its turning axis 62. The movement of these reversible part turn rotary actuators 55 at this time is such as to swing the face 59 at the heel of each blade upwardly from the position shown in FIG. 5 and thence inwardly to the position shown in FIG. 7, this rotation of the blades being about the turning axes 62. With such movement of the blades 55 from the position shown in FIG. 6 to the position shown in FIG. 7 about the turning axes 62 it will be seen that the elevated front and rear portions of the row of unbaked cookies 20 positioned as shown in FIG. 5 are inverted and folded over on top of the center of the cookies and on top of the pats or masses 21 of jelly thereon. This movement of the two blades 55 by the pair of reversible part turn rotary actuators 76 is continued to press down upon the folds of the cookie to the extent desired by the particular cookies being formed, this being dependent upon various factors such as the stiffness of the dough, the amount of jelly or the like included in each cookie, and the like. This positive downward pressing action of the blades 55 on the row of folded cookies is, however, of importance in securing exact uniformity in shape of all of the cookies produced.

Following this the pair of reversible part turn rotary actuators 85 and the cylinders 44 can be actuated simultaneously in reverse order to restore the blades 55 to the position shown in FIG. 8. This reverse action of the pair of reversible part turn rotary actuators 76 operates to rotate the blades 55 about the axes 62 so as to restore them to upright positions. This reverse action of the reversible part turn rotary actuators 85 serves to spread the blades 55 apart. This reverse action of the pistons in the cylinders 44 serves to raise the blades to an elevated position. Accordingly, the parts are in the position assumed at the start of this description of operation and the step-by-step belt 19 is advanced to bring another row of unbaked cookies into the zone for another sequence of operation of action of the cookie folder.

From the foregoing it will be seen that the present invention provides a very simple means for folding unbaked cookies arranged in transverse rows on a belt and which operates rapidly to fold cookies which when baked are of high quality and of uniform appearance.

We claim:

1. In a cookie machine, the combination of means for folding over portions of rows of unbaked cookie dough blanks, comprising a step-by-step conveyer belt adapted to carry crosswise thereon, at spaced stations rows of cookie dough blanks, an end head on said base at each side of said belt, at least one upright slideway on said end head, a member movable vertically along said slideway, at least one blade having a cutting edge lying in a plane at right angles to a belt to be parallel with said rows with its opposite ends arranged adjacent said members, means on each of said members for simultaneously reciprocating both ends of said blade in the same direction lengthwise of said belt, means on each of said members for rotating said blade in the same direction about an axis generally parallel with its edge, and means for simultaneously raising and lowering said members, whereby said blade can be lowered to bring its cutting edge onto said belt, moved lengthwise of said belt to move said cutting edge under said portions of said row of cookie dough blanks rotated to turn said portions of said row of cookie dough blanks over the other parts of said cookie dough blanks elevated to permit another row of cookie dough blanks to be advanced into the zone of action of said blade.

2. The combination set forth in claim 1 wherein each of said members is in the form of vertical slide plate having opposing faces generally parallel with the line of movement of said belt.

3. The combination set forth in claim 2 wherein said opposite ends of said blade are provided with trunnions which project through openings in said slide plates.

4. The combination set forth in claim 3 wherein said means for reciprocating said blade and said means for rotating said blade are arranged on the sides of said plates remote from said belt.

5. The combination set forth in claim 4 wherein said means for reciprocating said blade and said means for rotating said blade are each connected to reversible part turn rotary actuators to be actuated thereby.

6. In a cookie machine, the combination of means for folding over portions of rows of unbaked cookie dough blanks comprising a step-by-step conveyor belt adapted to carry crosswise thereon, at spaced stations rows of cookie dough blanks, a vertically movable member at each side of said belt, at least one blade having a cutting edge lying in a plane at right angles to a belt to be parallel with said rows with its oppoiste ends arranged adjacent said members, means on said members guiding said ends of said blade for horizontal movement lengthwise of said belt, cam means on each of said members for moving said ends of said blade along said guiding means, means on one of said members for rotating said blade about an axis generally parallel with its edge, and means for simultaneously raising and lowering said members, whereby said blade can be lowered to bring its cutting edge onto said belt, moved lengthwise of said belt to move said cutting edge under said portions of said row of cookie dough blanks, rotated to turn said portions of said row of cookie dough blanks over the other parts of said cookie dough blanks and elevated to permit another row of cookie dough blanks to be advanced into the zone of action of said blade.

7. The combination set forth in claim 6 wherein said cam means comprises a cam rotatably mounted on each of said members for rotation about a common horizontal axis extending transversely on the line of movement of said belt and having a cam face facing transversely of said blade, and a bearing on each end of said blade engaging said cam faces.

8. The combination set forth in claim 6 wherein said cam means comprises a gear mounted on each of said members to rotate about a common horizontal axis parallel with said blade and having a cam face facing transversely of said axis, a bearing on each end of said blade severally engaging said cam faces, and means for rotating said gear.

9. The combination set forth in claim 6 wherein said cam means comprises a gear arranged adjacent each of said members to rotate about a common horizontal axis parallel with said blade and having a cam face facing transversely of said axis, a bearing on each end of said blade severally engaging said cam faces, a drive pinion engaging said gear, a reversible part turn rotary actuator mounted on each of said members for actuating said drive pinions, and idler pinions on each of said members engaging said gear and holding it in engagement with said drive pinion.

10. The combination set forth in claim 6 wherein said at least one blade are two in number and arranged to fold both the front and rear portions of said row of cookie dough blanks, and wherein said cam means comprises a cam rotatably mounted on each of said members for rotation about a horizontal axis extending transversely of said belt and having a pair of cam faces facing transversely of said blades, and a bearing on each end of each of said blades engaging corresponding pairs of said cam faces.

11. In a cookie machine, the combination of means for folding over portions of rows of unbaked cookie dough blanks, comprising a step-by-step conveyor belt adapted to carry, crosswise thereon, at spaced stations rows of cookie dough blanks, a vertically movable member at each side of said belt, at least one generally horizontal cutting blade having a cutting edge generally lying in a plane at right angles to the belt to be parallel with said rows with its opposite ends arranged adjacent said members, means on each of said members for simultaneously reciprocating both ends of said blade in the same direction lengthwise of said belt, means for simultaneously raising and lowering said members, and means for rotating said blade, comprising a reversible part turn rotary actuator mounted on one of said members with its output shaft in line with said blade, and means operatively connecting said output shaft with the adjacent end of said blade.

12. In a cookie machine, the combination of means for folding over portions of rows of unbaked cookie dough blanks, comprising a step-by-step conveyor belt adapted to carry, crosswise thereon, at spaced stations rows of cookie dough blanks, a vertically movable slide plate at each side of said belt having opposing faces arranged generally parallel with the line of movement of said belt, at least one cutting blade having a cutting edge generally lying in a plane at right angles to a belt to be parallel with said rows, coaxial trunnions at the opposite ends of said blade, bearing bushings journalling said trunnions and slidingly fitted in horizontal slots in said slide plate extending transversely of said blades, a cam rotatably mounted on each slide plate for rotation about a horizontal axis extending transversely of the line of movement of said belt and having a cam face facing transversely of said blade and engaging the corresponding bearing bushing to move said bearing bushings along said slots in response to oscillation of said gear, means arranged to oscillate said gear, means of one of said slide plates for rotating said blade about an axis generally parallel with its edge, and means for simultaneously raising and lowering said slide plates, whereby said blade can be raised and lowered to bring its cutting edge into contact with said belt, moved lengthwise of said belt to move said cutting edge under said portions of said row of cookie dough blanks, rotated to turn said portions of said row of cookie dough blanks over other parts of said cookie dough blanks, and elevated to permit another row of cookie dough blanks to be advanced into the zone of action of said blade.

References Cited by the Examiner

UNITED STATES PATENTS

| | | | |
|---|---|---|---|
| 975,932 | 11/10 | Callow | 107—9 |
| 1,176,648 | 3/16 | Callow | 107—9 |
| 1,202,350 | 10/16 | Baker | 107—9 |
| 2,476,595 | 7/49 | Green | 153—33 |
| 2,887,141 | 5/59 | Bower | 153—33 |

ROBERT E. PULFREY, *Primary Examiner.*

JOSEPH D. BEIN, *Examiner.*